United States Patent [19]
Keating

[11] 3,911,249
[45] Oct. 7, 1975

[54] DEEP FAT FRYER WITH MELT CONTROL
[76] Inventor: Richard T. Keating, 715 S. 25th Ave., Bellwood, Chicago, Ill. 60104
[22] Filed: May 13, 1974
[21] Appl. No.: 469,386

[52] U.S. Cl. .................. 219/441; 99/403; 219/425; 219/489
[51] Int. Cl.² .......................................... F27D 11/02
[58] Field of Search .......... 219/413, 422, 425, 435, 219/436, 437, 441, 442, 489, 494, 501; 99/337, 403, 411; 317/33 C, 132; 337/312

[56] References Cited
UNITED STATES PATENTS

| | | | |
|---|---|---|---|
| 1,281,527 | 10/1918 | Collins | 219/422 |
| 2,805,314 | 9/1957 | Michalis | 219/437 |
| 3,018,356 | 1/1962 | Busch et al. | 219/489 |
| 3,221,141 | 11/1965 | Kamide | 219/413 |
| 3,221,143 | 11/1965 | Skala | 219/489 |
| 3,242,849 | 3/1966 | Wells | 99/411 |
| 3,385,953 | 5/1968 | Henneberger | 219/489 X |
| 3,648,012 | 2/1972 | Holtkamp | 219/413 |
| 3,720,155 | 3/1973 | Fritzsche | 99/403 X |
| 3,824,373 | 7/1974 | Napier | 219/494 |
| 3,825,725 | 7/1974 | Leitner et al. | 219/501 X |

*Primary Examiner*—Volodymyr Y. Mayewsky
*Attorney, Agent, or Firm*—John R. Diver

[57] ABSTRACT

A controlled melt system for starting up a deep fat fryer using pulses of heat for melting newly packed or solidified fat therein without overheating or burning. Fry temperature once attained is thermostatically controlled.

3 Claims, 5 Drawing Figures

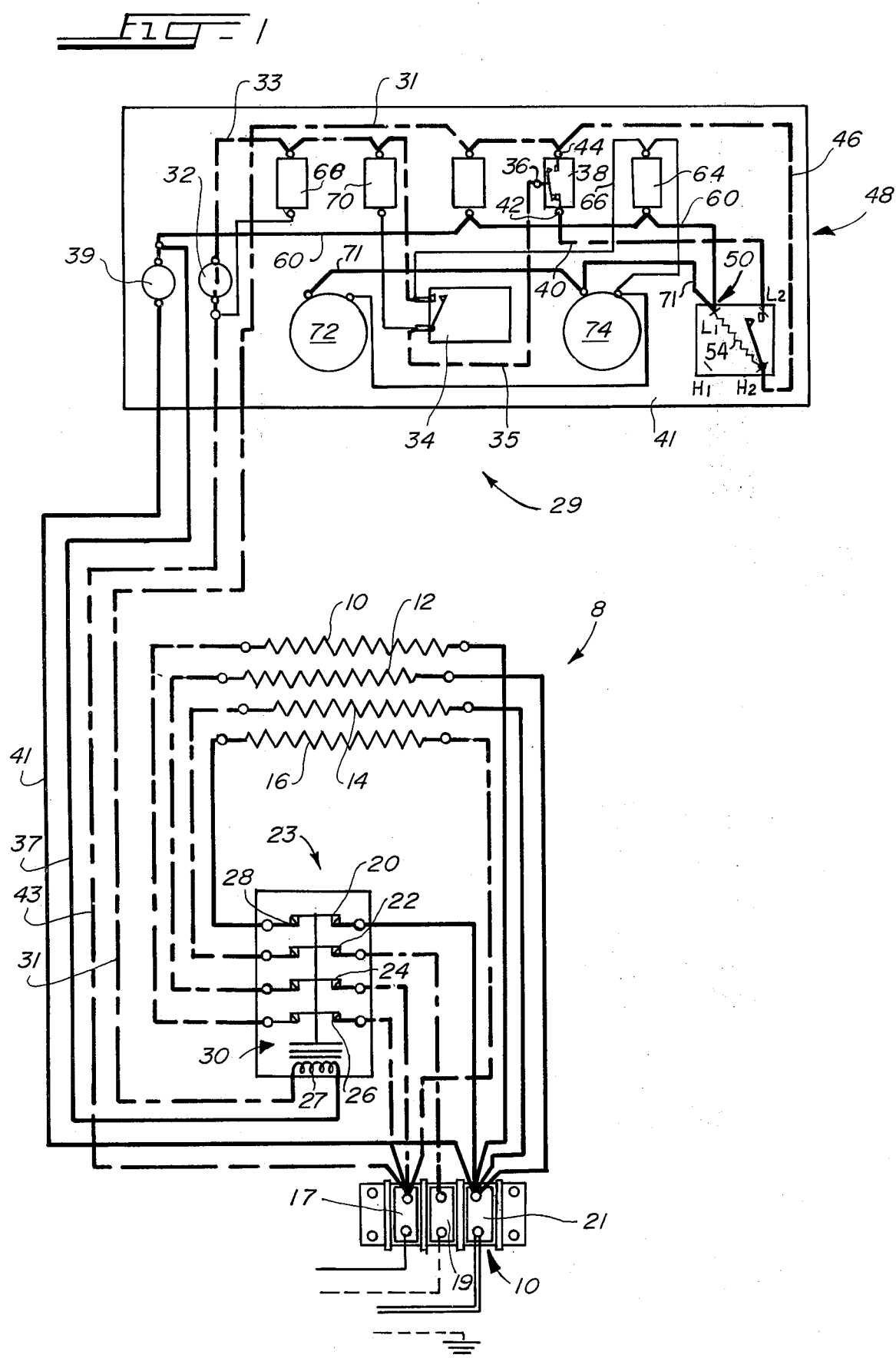

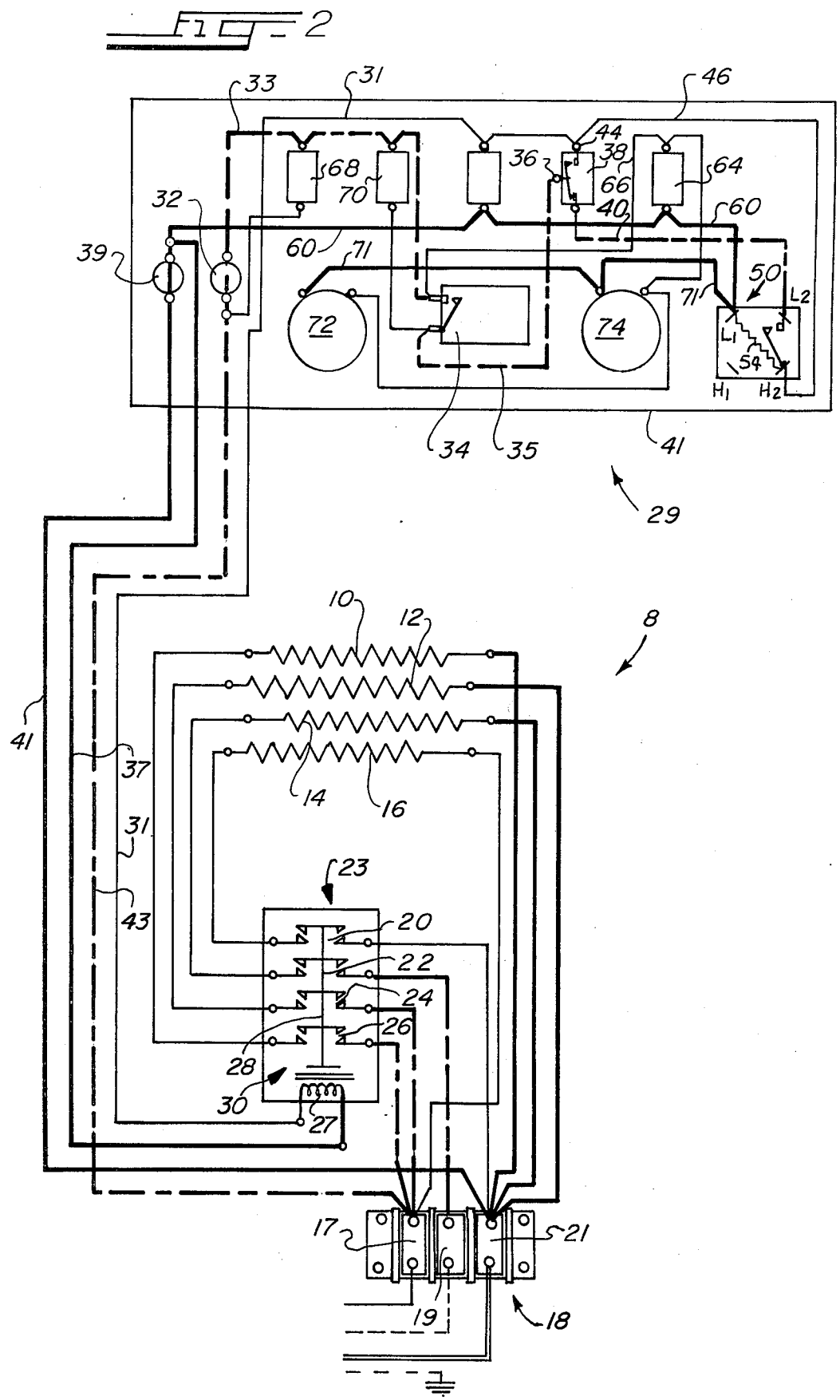

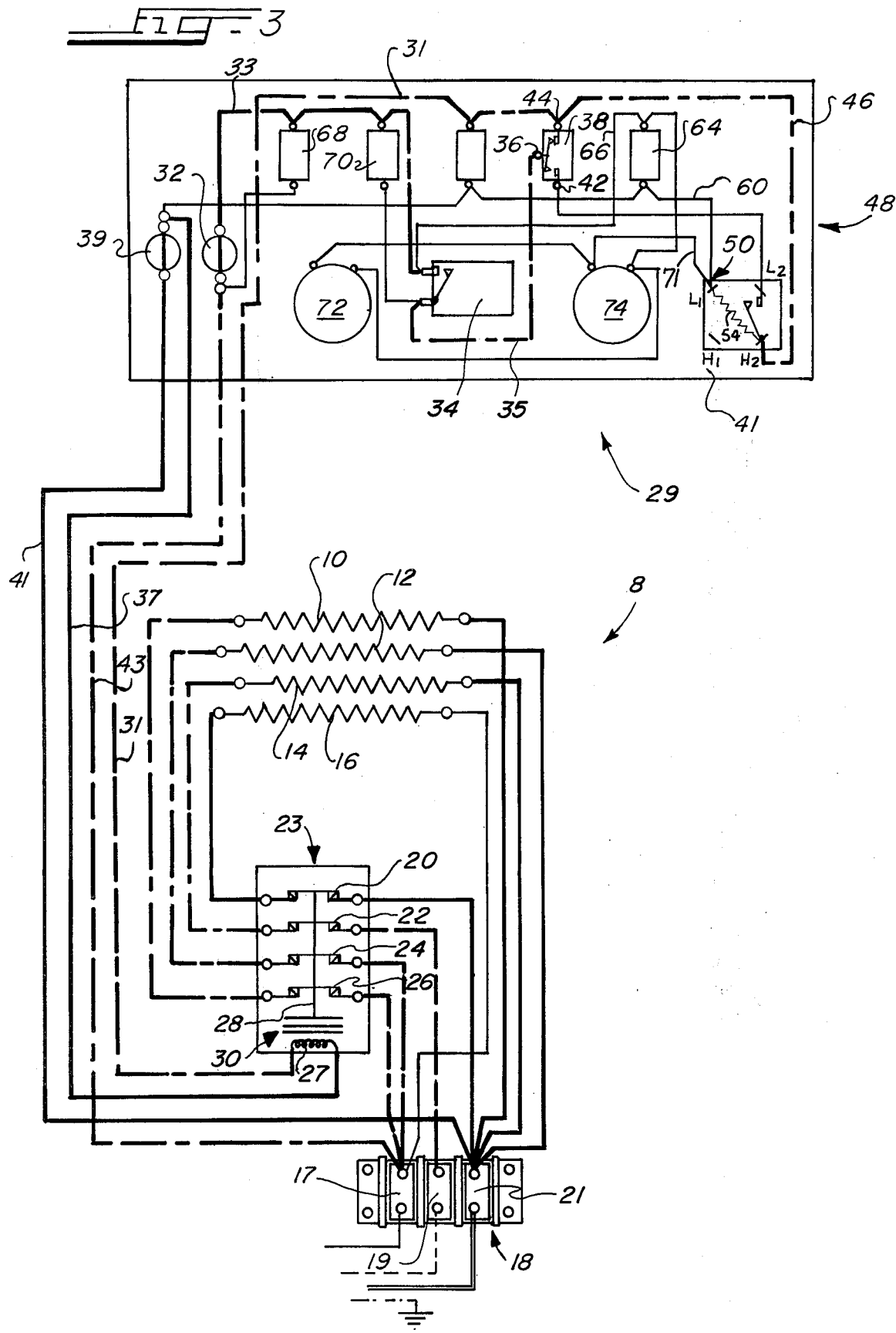

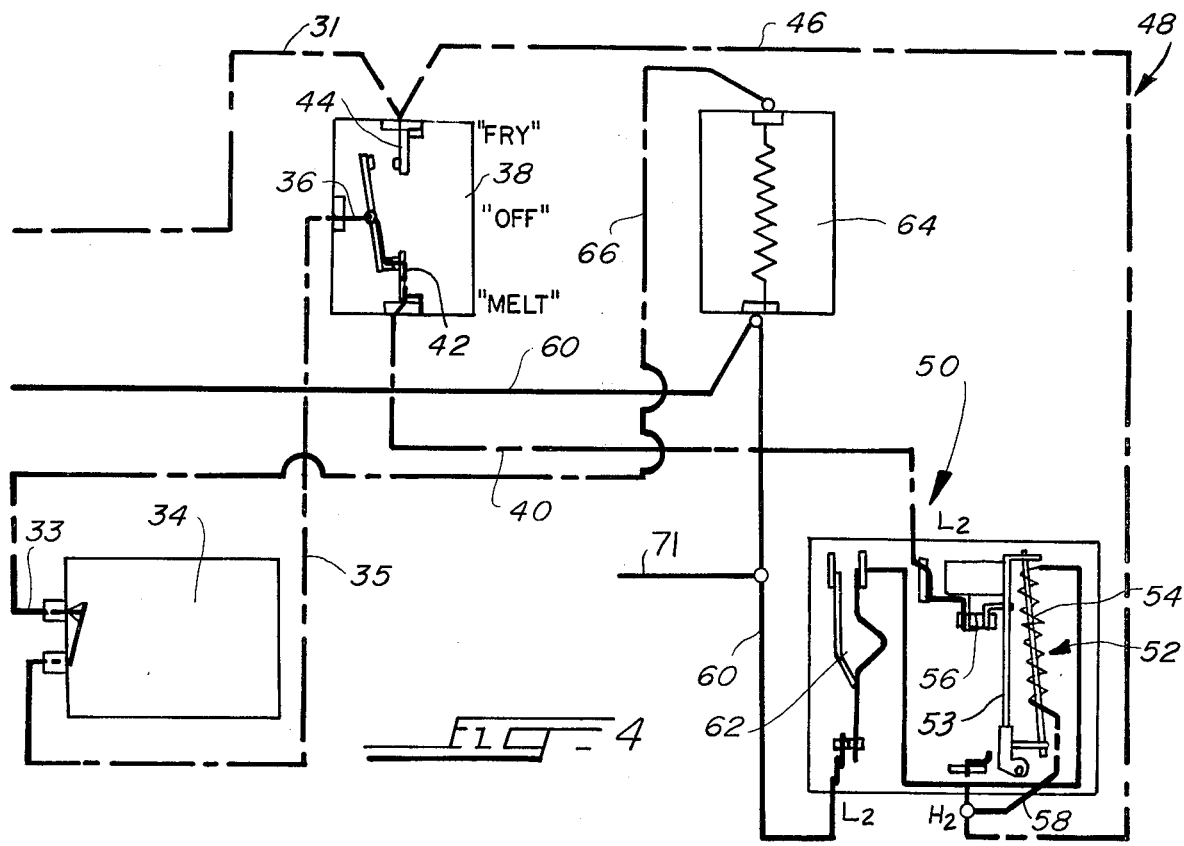
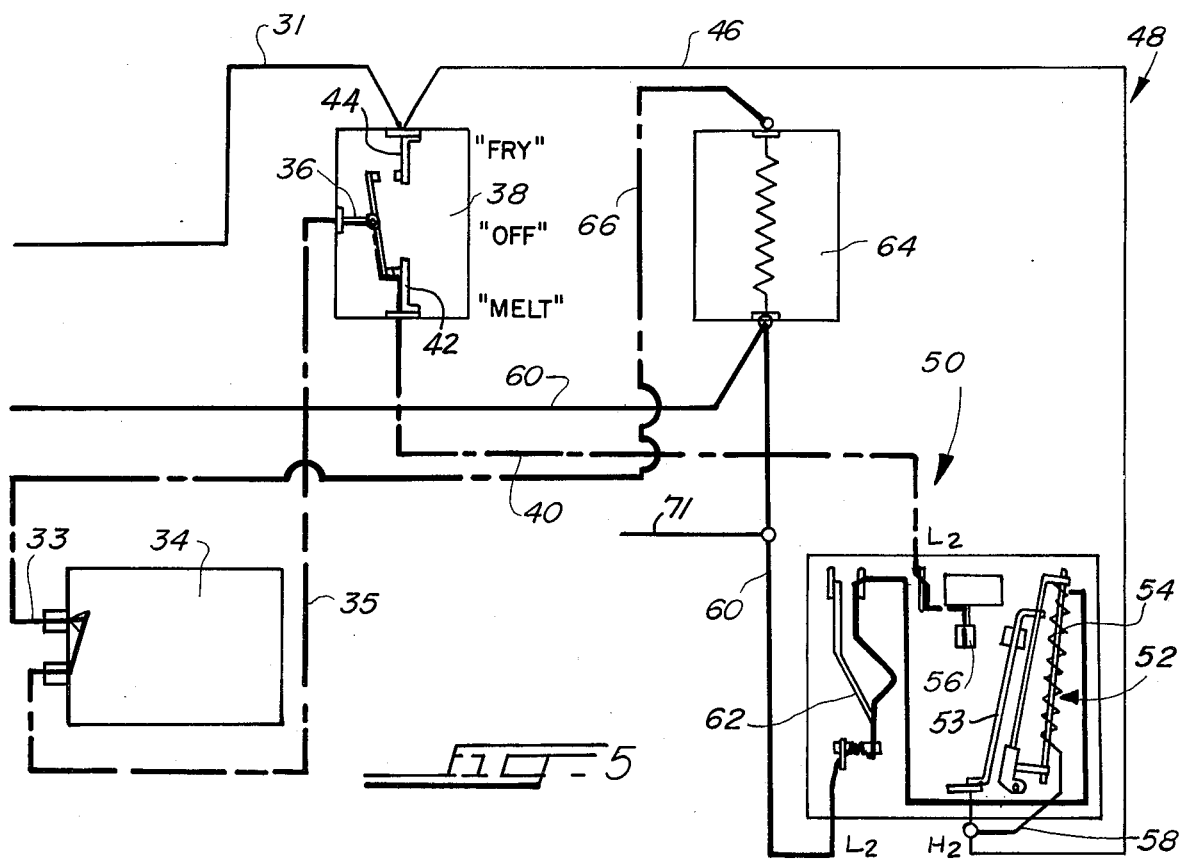

3,911,249

DEEP FAT FRYER WITH MELT CONTROL

BACKGROUND OF THE INVENTION

As the heat input to deep fat fryers has been increased over the years, a problem has developed. This problem, in particular, arises with solid fat newly packed in the fryer. Following periodic removal and replacement of the used fat, solidified new fat is packed down around the heat transfer tubes of a conventional deep fat fryer. When the tubes are heated at the normal rate, the fat in contact with the tubes melts quickly and falls away leaving cavities with nothing to quickly conduct the heat to the remaining fat. It is at these cavities where the fat is not in contact with the tubes that a problem of overheating of the tube and carmelizing residual fat thereon arises.

Thus, when the usual fryer is first turned on, the tube adjacent to a cavity where there is no fat to absorb the heat generated therefrom elevates in temperature. This temperature rises sufficiently so that any grease remaining on the heat transfer tubes carbonizes and causes a varnish-like deposit to adhere to the tubes. In extreme cases, when the fat cavitates away from the surface of the heat transfer tubes, the tubes can attain such a high temperature that the fat actually breaks into flame. This deposit builds up on the tubes as time goes on requiring extensive periodic cleaning of the fryer and the boiling out of the fryer with a caustic-like material.

There is thus an established need for a deep fat fryer using pulsed heating to limit heat input to newly packed or solidified fat during start-up.

SUMMARY OF THE INVENTION

The gist of this invention lies in a melt system for a deep fat fryer with controlled melt during start whereby periodic intermittent heating pulses made up of at least an integral number of full line voltage half-cycle A.C. power waves add heat at a low average rate for melting newly packed or solidified fat without burning.

A 3-phase power circuit has electrical heating elements connected in "Δ" or "Y" hookup and has a switch in each of the legs therein, all switches in all legs commonly actuated by a single bar operationally connected to each switch in each leg thereof. A single phase control circuit has the armature of a solenoid operationally connected to the bar and each terminal thereof electrically connected to first and second terminals of a fat melt control switch. The first and third terminals thereon are each electrically connected to the two terminals of the single phase power supply. The fat melt control switch generates electrical pulses at line voltage in the control circuit in the form of at least an integral number of full line voltage half-cycle A.C. power waves and adds heat at a low average rate during start-up of the fryer such as will not burn the newly-packed fat during start-up of the fryer. A conventional thermostatic control maintains fry temperature of the liquid fat.

The fat melt control switch comprises a thermal relay in which power circuit and the control circuit are both simultaneously opened by the passage of a predetermined set time.

DESCRIPTION OF THE DRAWINGS

FIG. 1 shows 3-phase power and single phase control circuits set for "melt" when an A.C. control voltage and power heating pulse is being generated;

FIG. 2 shows the same for when an A.C. control voltage and power heating pulse is not being generated;

FIG. 3 shows 3-phase power and control circuits set for "fry" with fat temperature below setpoint;

FIG. 4 shows the single phase control circuit in detail set for "melt" when a voltage pulse is being generated; and FIG. 5 shows the same as FIG. 4 when a voltage pulse is not being generated.

DESCRIPTION OF THE PREFERRED EMBODIMENT

Reference is made to FIGS. 1 and 2 wherein a power circuit 8 which is connected up for the "melt" condition by connecting up terminals 36 and 42 of rocker switch 38 comprises electrical heating elements 10, 12 and 14 each of which is connected at one end thereof to terminal 21 of 3-phase terminal block 18 and element 16 which is connected to block terminal 17. Single-throw bi-pole switches 22, 24 and 26 have one pole thereof connected to the other ends of elements 10, 12 and 14, respectively, and switch 20 which is connected to the other end of element 16. Terminal 19 of terminal block 18 connects to the other pole of switch 22, terminal 17 connects to the other poles of switches 24 and 26, and terminal 21 connects to the other pole of switch 20. A bar element 38 is operationally connected to the arm of each of the bi-pole switches 20, 22, 24 and 26. Solenoid 30 is shown in FIG. 1 energized in the pulse generating mode and closes bi-pole switches 20, 22, 24 and 26 for a pulse input of heat during start-up. Solenoid 30 is shown in FIG. 2 de-energized in the non-generating pulse mode by opening bi-pole switches 20, 22, 24 and 26 for no pulse input of heat during the same. Solenoid 30 is shown in FIG. 3 energized in the thermostatically controlled mode connected up for "fry" condition by connecting up terminals 36 and 44 of rocker switch 38 closing bi-pole switches 20, 22, 24 and 26 for addition of heat wherein the pulse input mode of heat has been deactivated bypassing solenoid 30 by connecting up for the "fry" condition.

Reference is made to FIGS. 1, 2, 4 and 5 wherein a control circuit 29 which has been set for the "melt" condition by proper throwing of rooker switch 38 comprises an electrical relay 23 which has its armature operationally connected to the bar 28 which is actuated by its coil 27. A conductor 31 connects to one terminal of the coil 27. A fuse 32 connects at one terminal to conductor 43 and at the other terminal to conductor 33. Conductor 43 connects to terminal 17 of terminal block 18. A conductor 37 connects to the other terminal of the coil 27. A fuse 39 has one terminal connecting to the conductor 37 and the other terminal connecting to one end of a conductor 41. Terminal 21 of terminal block 18 connects to the other end of conductor 41.

Rocker switch 38 mounts on control panel 41 with an "off" pole 36, a "melt" pole 42 and a "fry" pole 44 marking operating conditions. A thermostat 34 has one terminal connecting to conductor 33 and the other terminal connecting to conductor 35. "Off" pole 36 connects to conductor 35. "Fry" pole 44 connects to conductor 31. Bypass circuit 48 which comprises a first bypass conductor 46 also connects to conductor 31, and a second bypass conductor 40 connects to "melt" pole 42 such that when rocker switch 38 has its arm contacting the "fry" pole 44, as shown in FIG. 3, solenoid 30 is supplied by current directly from thermostat 34; whereas when switch 38 has its arm contacting "melt" pole 42, as shown in FIGS. 1 and 2, solenoid 30 is supplied by current through bypass circuit 48.

A fat melt control or heat pulse generator 50, as shown in FIGS. 4 and 5, having one terminal $L_2$ connected to conductor 40, another terminal $H_2$ connected to conductor 46 and a third terminal $L_1$ connected to conductors 60 and 71 and thence to timers 72 and 74 in the bypass circuit 48 comprises a commercially available "infinite control switch" which includes a thermal relay 52 having a periodically energized heater element coil 54 mounted on a bi-metallic strip 53 with one terminal connected to conductor 46 and the other terminal connected to a conductor 58, this cyclically opens normally closed electrical contacts 56 in the circuit comprising heating element 54 for a rated delay period de-energizing heater 54 followed by a closing of contacts 56 after the de-energized heater 54 cools down their normally closed condition in heating cycle of heater 54. An on-off switch 62 having one terminal connected to the conductor 58 through the heating element 54 and the other terminal connected to a conductor 60 controls makes it possible to manually deactivate the operation of fat melt control 50. Conductor 60 through fuse 39 and conductor 41 with terminal 21 of terminal block 18. A pilot light 64 having one terminal connected to conductor 60 connects through conductor 66 which connects to conductor 33 to one terminal of the thermostat 34. 68 and 70 and timers 72 and 74 are connected in the control circuit 29 for purposes not relevant to this invention.

In the operation of control circuit 29 and power circuit 8 with switch 38 set on "fry" and the temperature of the fat below "fry," the contacts of the thermostat 34 are closed and if the fat melt control 50 is energized for creating a heat pulse, as shown in FIGS. 1 and 4, conductor 31 connects with conductor 46 which connects through contacts 56 in fat melt control 50. the conductor 40 connects to the contacts 56 of the melt control 50. Fat melt control 50 has contacts 56 normally closed to create a heat pulse and connects conductors 46 and 40 therethrough. The "melt" pole 42 of rocker switch 38 connects the conductor 40 to the common terminal 36 of the switch 38 and conductor 35 connects terminal 36 with one terminal of thermostat 34. The contacts of thermostat 34 are closed normally so that conductor 33 is connected through to conductor 35 when the fat temperature is below fry temperature. Terminal 17 of terminal block 18 is connected to conductor 33 so that one terminal of coil 27 of the relay 23 is at one polarity and the other terminal thereof is at an opposite polarity by connection with conductor 37 and thence to terminal 21 of terminal block 18. Relay 23 is thus energized closing switches 20, 22, 24 and 26 to create a heat pulse for "melt."

In the operation of control circuit 29 and power circuit 8 with switch 38 set on "melt" and the temperature of the fat is below "fry," the contacts of the thermostat 34 are closed and if the heater 54 of the fat melt control 50 is de-energized so as not to create a heat pulse, as shown in FIGS. 2 and 5, conductor 31 is disconnected from conductor 40 and ultimately from terminal 17 of terminal block 18. Relay 23 is thus de-energized opening switches 20, 22, 24 and 26 to de-energize the heat pulse for "melt."

In the operation of control circuit 29 and power circuit 8 with switch 38 set on "fry" and the temperature of the fat is the fat melt control 50 is bypassed, and the thermostat 34 is conducting to coil 27 rocker switch 38 connects to the common terminal 36 thereof which connects through the conductor 35 which leads to to thermostat 34. The contacts of thermostat 34 are closed so that conductor 33 is connected through to conductor 35. Terminal 17 of terminal block 18 is connected through conductor 43 and fuse 32 to conductor 33 so that one terminal of coil 27 of the relay 23 is at one polarity. The other terminal of coil 27 thereof is at an opposite polarity by connection with conductor 37 through fuse 39 to terminal 21 of terminal block 18. Relay 23 is thus energized closing switches 20, 22, 24 and 26 to maintain "fry" heat solely under control of thermostat 34.

Although but one specific embodiment of this invention is herein shown and described, it will be understood that details of the construction shown may be altered or omitted without departing from the spirit of the invention as defined by the following claims.

I claim:

1. A controlled melt system for a deep fat fryer having an open top vessel with electrically-heated heat transfer tubes therein contacted by packed solidified fat and including electrical control means for a controlled melt during startup comprising:
    a. a 120–240 volts of A.C. electrical power;
    b. a power circuit comprising a plurality of heating elements connected to the source; and
    c. a control circuit including a periodically actuated time delay means connected between the power circuit and the source for supplying intermittent pulses each made up of a plurality of full line voltage half-cycle A.C. power waves to the heating elements whereby the heating tube is prevented from overheating and solid fat packed therein melts without burning during startup.

2. A controlled melt system for a deep fat fryer as set forth in claim 1 wherein said control circuit comprises:
    a. a plurality of "on-off" switches each in series connection with a respective heating element;
    b. a bar element mechanically connecting the operating arm of each of said switches one to the other in like multiple array;
    c. a solenoid having its armature operationally connected to the bar element;
    d. the time delay means includes a pulse generator connected to the solenoid for intermittent operation of the heating elements,
    e. said pulse generator comprising a periodically heated bimetallic switch means for alternately energizing and deenergizing said solenoid.

3. Controlled melt system for a deep fat fryer with melt control during startup comprising a power circuit having first, second and third electrical heating elements hooked up in "Y" or "Δ" and connected at one end thereof to first, second and third terminals of a 3-phase terminal block; first, second and third single-throw bi-pole switches each switch having one pole thereof connected to the other end of each of the heating elements; first, second and third terminals of the 3- phase terminal block connected to the other poles of the first, second and third switches, a bar element operationally connected to the actuating arm of each of the first, second and third switches, a solenoid armature operationally connected to the bar for actuating the first, second and third switches for a pulse controlled heat input during "melt" and for continuous thermostatic controlled heat input during "fry"; a by-pass "melt" control circuit comprising a solenoid coil operationally connected to the solenoid armature, a first conductor connected at one end to one terminal of the solenoid coil, a first fuse connected at the other end of the first conductor and to one terminal of the 3-phase terminal block, a second conductor connected at one end to the other terminal of the solenoid coil, an "infinite control switch" connected at one terminal to the other end of the second conductor, a third conductor connected at one end to the other terminal of the "infinite control switch", a rocker switch having a "melt" pole connected to the other end of the third conductor, a fourth conductor connected at one end to the common pole of the rocker switch, a thermostat having one terminal connected to the other end of the fourth conductor, a fifth conductor connected at one end to the other terminal of the thermostat, a second fuse connected at the other end of the fifth conductor and to another terminal of the 3-phase terminal block; a "fry" control circuit comprising the solenoid coil operationally connected to the armature, the second conductor connected at one end to the other terminal of the solenoid coil, the fourth conductor connected at the one end to the common pole of the rocker switch, the thermostat having one terminal connected to the other end of the fourth conductor, the fifth conductor connected at the one end to the other terminal of the thermostat, the second fuse connected to the other end of the fifth conductor and to the other terminal of the 3-phase terminal block.

* * * * *